United States Patent
Clawson et al.

(10) Patent No.: US 6,254,839 B1
(45) Date of Patent: Jul. 3, 2001

(54) APPARATUS FOR CONVERTING HYDROCARBON FUEL INTO HYDROGEN GAS AND CARBON DIOXIDE

(75) Inventors: Lawrence G. Clawson, Dover; William L. Mitchell, Belmont; Jeffrey M. Bentley, Westford; Johannes H. J. Thijssen, Cambridge, all of MA (US)

(73) Assignee: Arthur D. Little, Inc., Cambridge, MA (US)

(*) Notice: Subject to any disclaimer, the term of this patent is extended or adjusted under 35 U.S.C. 154(b) by 0 days.

(21) Appl. No.: 09/185,393

(22) Filed: Nov. 3, 1998

Related U.S. Application Data

(62) Division of application No. 08/703,398, filed on Aug. 26, 1996, now Pat. No. 6,126,908.

(51) Int. Cl.[7] .................... B01J 8/04; C01B 3/26
(52) U.S. Cl. ............... 422/190; 422/191; 422/193; 422/198; 422/211; 423/650; 423/651; 423/652
(58) Field of Search .................... 252/372, 373; 422/188, 189, 190, 191, 193, 198, 200, 201, 211; 423/650, 651, 652, 655

(56) References Cited

U.S. PATENT DOCUMENTS

| | | |
|---|---|---|
| 1,797,426 | 3/1931 | Larson . |
| 3,334,971 | 8/1967 | James et al. . |
| 3,367,882 | 2/1968 | Marshall, Jr. . |
| 3,438,759 | 4/1969 | Linden et al. . |
| 3,499,797 | 3/1970 | Hooper . |

(List continued on next page.)

FOREIGN PATENT DOCUMENTS

| | | |
|---|---|---|
| 2030915 | 11/1990 | (CA) . |
| 0 112 613 A2 | 7/1984 | (EP) . |
| 0 312 757 A1 | 4/1989 | (EP) . |
| 0 360 505 A2 | 3/1990 | (EP) . |
| 0 361 648 A1 | 4/1990 | (EP) . |

(List continued on next page.)

OTHER PUBLICATIONS

Houseman, J., et al., "On–Board Hydrogen Generator for a Partial Hydrogen Injection Internal Combustion Engine," Society of Automotive Engineers, West Coast Meeting, Anaheim, California, Aug. 12–16, 1974, pp. 1–13.

Twigg, M.V., Editor, "Zink Oxide," *Catalyst Handbook*, Second Edition, Sections 4.11.1 to 4.11.9, Wolfe Publishing, 1989.

Catalytica Associates, Inc., "Overview of Fuel–Processing Technologies for Fuel–Cell Power Generation," Catalytica File No. 1036, Nov. 6, 1978.

Little, Arthur D., "On–Board Ethanol Fuel Processor: Integrated System Design," Feb. 15, 1995, Washington, D.C., U.S.A.

*Primary Examiner*—Marian C. Knode
*Assistant Examiner*—Frederick Varcoe
(74) *Attorney, Agent, or Firm*—Wallenstein & Wagner, Ltd.

(57) ABSTRACT

A hydrocarbon fuel reformer (200) is disclosed suitable for producing synthesis hydrogen gas from reactions with hydrocarbons fuels, oxygen, and steam. The reformer (200) comprises first and second tubes (208,218). The first tube (208) includes a first catalyst (214) and receives a first mixture of steam and a first fuel. The second tube (218) is annularly disposed about the first tube (208) and receives a second mixture of an oxygen-containing gas and a second fuel. In one embodiment, a third tube (224) is annularly disposed about the second tube (218) and receives a first reaction reformate from the first tube (208) and a second reaction reformate from the second tube (218). A catalyst reforming zone (260) annularly disposed about the third tube (224) may be provided to subject reformate constituents to a shift reaction. In another embodiment, a fractionator is provided to distill first and second fuels from a fuel supply source.

11 Claims, 3 Drawing Sheets

U.S. PATENT DOCUMENTS

| | | |
|---|---|---|
| 3,531,263 | 9/1970 | Sederquist . |
| 3,541,729 | 11/1970 | Dantowitz . |
| 3,615,217 | 10/1971 | O'Brien et al. . |
| 3,645,701 | 2/1972 | Banchik et al. . |
| 3,666,423 | 5/1972 | Muenger . |
| 3,666,682 | 5/1972 | Muenger . |
| 3,787,038 | 1/1974 | Tesner et al. . |
| 3,796,547 | 3/1974 | Muenger . |
| 3,909,299 | 9/1975 | Corrigan . |
| 3,920,416 | 11/1975 | Houseman . |
| 3,944,394 * | 3/1976 | McClintock et al. ............ 422/201 |
| 3,955,941 | 5/1976 | Houseman et al. . |
| 3,971,847 | 7/1976 | Houseman . |
| 3,982,910 | 9/1976 | Houseman et al. . |
| 4,059,076 | 11/1977 | Kosaka et al. . |
| 4,125,090 | 11/1978 | Masunaga et al. . |
| 4,233,180 | 11/1980 | Hausberger et al. . |
| 4,236,941 | 12/1980 | Main, Jr. . |
| 4,257,920 | 3/1981 | Sugier et al. . |
| 4,338,292 | 7/1982 | Duranleau . |
| 4,365,006 | 12/1982 | Baker . |
| 4,452,854 | 6/1984 | Merriam et al. . |
| 4,476,683 | 10/1984 | Shah et al. . |
| 4,504,447 | 3/1985 | Spurrier et al. . |
| 4,522,894 | 6/1985 | Hwang et al. . |
| 4,670,357 | 6/1987 | Taylor . |
| 4,678,723 | 7/1987 | Wertheim . |
| 4,716,023 | 12/1987 | Christner et al. . |
| 4,729,930 | 3/1988 | Beal et al. . |
| 4,737,161 | 4/1988 | Szydlowski et al. . |
| 4,738,903 | 4/1988 | Garow et al. . |
| 4,743,517 | 5/1988 | Cohen et al. . |
| 4,781,241 | 11/1988 | Misage et al. . |
| 4,789,384 | 12/1988 | Martens et al. . |
| 4,789,540 | 12/1988 | Jenkins . |
| 4,792,502 | 12/1988 | Trocciola et al. . |
| 4,801,356 | 1/1989 | Grasso . |
| 4,804,591 | 2/1989 | Grasso et al. . |
| 4,816,040 | 3/1989 | Bonville et al. . |
| 4,822,521 | 4/1989 | Fuderer . |
| 4,828,940 | 5/1989 | Cohen et al. . |
| 4,830,091 | 5/1989 | Dierke et al. . |
| 4,835,072 | 5/1989 | Grasso et al. . |
| 4,836,831 | 6/1989 | Martens . |
| 4,838,020 | 6/1989 | Fujitsuka . |
| 4,849,187 | 7/1989 | Uozu et al. . |
| 4,861,347 | 8/1989 | Szydlowski et al. . |
| 4,865,926 | 9/1989 | Levy et al. . |
| 4,879,189 | 11/1989 | Snopkowski . |
| 4,888,031 | 12/1989 | Martens . |
| 4,888,130 * | 12/1989 | Banquy ............................ 252/373 |
| 4,897,253 | 1/1990 | Jenkins . |
| 4,904,455 | 2/1990 | Karafian et al. . |
| 4,909,808 * | 3/1990 | Voecks ................................. 48/94 |
| 4,923,767 | 5/1990 | Grasso et al. . |
| 4,923,768 | 5/1990 | Kaneko et al. . |
| 4,943,493 | 7/1990 | Vartanian . |
| 4,973,528 | 11/1990 | Sanderson . |
| 4,973,529 | 11/1990 | Grasso et al. . |
| 4,988,580 | 1/1991 | Ohsaki et al. . |
| 4,994,331 | 2/1991 | Cohen . |
| 5,006,131 | 4/1991 | Karafian et al. . |
| 5,019,463 | 5/1991 | Matsubara et al. . |
| 5,026,536 | 6/1991 | Shioiri et al. . |
| 5,030,440 | 7/1991 | Lywood et al. . |
| 5,030,661 | 7/1991 | Lywood . |
| 5,047,299 | 9/1991 | Shockling . |
| 5,059,494 | 10/1991 | Vartanian et al. . |
| 5,084,363 | 1/1992 | Reiser . |
| 5,141,823 | 8/1992 | Wright et al. . |
| 5,193,635 | 3/1993 | Mizuno et al. . |
| 5,200,278 | 4/1993 | Watkins et al. . |
| 5,202,195 | 4/1993 | Stedman et al. . |
| 5,207,185 | 5/1993 | Greiner et al. . |
| 5,221,586 | 6/1993 | Morimoto et al. . |
| 5,246,791 | 9/1993 | Fisher et al. . |
| 5,248,566 | 9/1993 | Kumar et al. . |
| 5,248,567 | 9/1993 | Amemiya et al. . |
| 5,260,640 | 11/1993 | Carabetta et al. . |
| 5,275,632 | 1/1994 | Corrigan . |
| 5,299,536 | 4/1994 | Moard et al. . |
| 5,300,275 | 4/1994 | Lywood . |
| 5,316,747 | 5/1994 | Pow et al. . |
| 5,330,857 | 7/1994 | Sederquist et al. . |
| 5,340,663 | 8/1994 | Buswell et al. . |
| 5,344,721 | 9/1994 | Sonai et al. . |
| 5,346,779 | 9/1994 | Nakazawa . |
| 5,360,679 | 11/1994 | Buswell et al. . |
| 5,419,978 | 5/1995 | Landau . |
| 5,437,123 | 8/1995 | Greiner et al. . |
| 5,441,546 | 8/1995 | Moard et al. . |
| 5,451,249 | 9/1995 | Spiegel et al. . |
| 5,458,857 * | 10/1995 | Collins et al. ...................... 422/198 |
| 5,470,360 | 11/1995 | Sederquist . |
| 5,484,577 | 1/1996 | Buswell et al. . |
| 5,486,313 | 1/1996 | DeJong et al. . |
| 5,486,428 | 1/1996 | Gardner et al. . |
| 5,503,944 | 4/1996 | Meyer et al. . |
| 5,527,632 | 6/1996 | Gardner . |
| 5,529,484 | 6/1996 | Moard et al. . |
| 5,546,701 | 8/1996 | Greiner et al. . |
| 5,637,415 | 6/1997 | Meltser et al. . |
| 5,643,692 | 7/1997 | Ohmi . |
| 5,645,950 | 7/1997 | Benz et al. . |
| 5,648,182 | 7/1997 | Hara et al. . |
| 5,651,800 | 7/1997 | Mizuno et al. . |
| 5,700,595 | 12/1997 | Reiser . |
| 5,733,347 | 3/1998 | Lesieur . |
| 5,792,572 | 8/1998 | Foley et al. . |

FOREIGN PATENT DOCUMENTS

| | | |
|---|---|---|
| 0 600 621 A1 | 6/1994 | (EP) . |
| 0 621 1501 | 8/1994 | (EP) . |
| 1 060 166 | 9/1964 | (GB) . |
| 1 408 560 | 10/1975 | (GB) . |
| 2 084 894 | 4/1982 | (GB) . |
| 2 179 366 | 3/1987 | (GB) . |
| 2268 322 | 1/1994 | (GB) . |
| 2 296 719 | 7/1996 | (GB) . |
| WO 97/44123 | 11/1997 | (WO) . |
| WO 98/08771 | 3/1998 | (WO) . |

* cited by examiner

APPARATUS FOR CONVERTING HYDROCARBON FUEL INTO HYDROGEN GAS AND CARBON DIOXIDE

RELATED U.S. APPLICATION DATA

This Application is a divisional of U.S. application Ser. No. 08/703,398, filed Aug. 26, 1996, subsequently issued as U.S. Pat. No. 6,126,908, upon which a claim of priority is based.

GOVERNMENTS RIGHTS

The Government has rights in this invention pursuant to Contract No. DE-AC0292CE50343, awarded by the U.S. Department of Energy.

TECHNICAL FIELD

The present invention relates to the development of synthesis gas for use in power generation and, in particular, to the processing of hydrocarbon fuel to produce hydrogen gas.

BACKGROUND OF THE INVENTION

Fuel cells continue to play an increasingly important role in power generation for both stationary and transportation applications. A primary advantage of fuel cells is their highly efficient operation which, unlike today's heat engines, are not limited by Carnot cycle efficiency. Furthermore, fuel cells far surpass any known energy conversion device in their purity of operation. Fuel cells are chemical power sources in which electrical power is generated in a chemical reaction between a reducer (hydrogen) and an oxidizer (oxygen) which are fed to the cells at a rate proportional to the power load. Therefore, fuel cells need both oxygen and a source of hydrogen to function.

There are two issues which are contributing to the limited use of hydrogen gas today. Firstly, hydrogen gas ($H_2$) has a low volumetric energy density compared to conventional hydrocarbons, meaning that an equivalent amount of energy stored as hydrogen will take up more volume than the same amount of energy stored as a conventional hydrocarbon. Secondly, there is presently no widespread hydrogen infrastructure which could support a large number of fuel cell power systems.

An attractive source of hydrogen to power fuel cells is contained in the molecular structure of various hydrocarbon and alcohol fuels. A reformer is a device that breaks down the molecules of a primary fuel to produce a hydrogen-rich gas stream capable of powering a fuel cell. Although the process for reforming hydrocarbon and alcohol fuels is established on a large industrial basis, no known analogous development has occurred for small-scale, highly integrated units.

Therefore, a need exists for a more compact apparatus for generating hydrogen gas from a variety of hydrocarbon fuel sources for use in a fuel cell to power a vehicle.

SUMMARY OF THE INVENTION

The present invention relates to a reformer and method for converting an alcohol or hydrocarbon fuel into hydrogen gas and carbon dioxide.

The reformer includes a first vessel having a partial oxidation reaction zone and a separate steam reforming reaction zone that is distinct from the partial oxidation reaction zone. The first vessel has a first vessel inlet at the partial oxidation reaction zone and a first vessel outlet at the steam reforming zone. The reformer also includes a helical tube extending about the first vessel. The helical tube has a first end connected to an oxygen-containing source and a second end connected to the first vessel at the partial oxidation reaction zone. Oxygen gas from an oxygen-containing source can be directed through the helical tube to the first vessel. A second vessel having a second vessel inlet and second vessel outlet is annularly disposed about the first vessel. The helical tube is disposed between the first vessel and the second vessel and gases from the first vessel can be directed through the second vessel.

The method includes directing oxygen-containing gas through a helical tube which is disposed around a first vessel. Hydrocarbon vapor and steam are directed into the helical tube to form a mixture of oxygen gas, fuel vapor and steam. The mixture of oxygen gas, fuel vapor and steam are directed into the first vessel. The fuel vapor partially oxidizes to form a heated reformate stream that includes carbon monoxide and hydrogen gas. The remaining fuel vapor is steam reformed in the heated reformate stream to form hydrogen gas and carbon monoxide. The heated reformate stream is directed over the exterior of the helical tube, whereby the heated reformate stream heats the mixture in the helical tube. A portion of the carbon monoxide gas of the reformate stream is converted to carbon dioxide and hydrogen gas by a high temperature shift reaction. At least a portion of the remaining carbon monoxide gas of the reformate stream is converted to carbon dioxide and hydrogen gas by a low temperature shift reaction.

In another embodiment of a reformer for converting a hydrocarbon fuel into hydrogen gas and carbon dioxide, the apparatus includes a first tube which has a first tube inlet for receiving a first mixture of an oxygen-containing gas and a first fuel, which can be a hydrocarbon or an alcohol, and a first tube outlet for conducting a first reaction reformate of the first mixture. A second tube is annularly disposed about the first tube, wherein the second tube has a second tube inlet for receiving a second mixture of a second fuel, which can be a hydrocarbon or an alcohol, and steam. The second tube has a second tube outlet for conducting a second reaction reformate of the second mixture. A catalyst reforming zone is annularly disposed about the second tube. The first reaction reformate and the second reaction reformate can be directed through the first tube outlet and the second tube outlet, respectively, to the catalyst reforming zone for further reforming of the mixtures. In a preferred embodiment, a hydrocarbon fuel fractionator is attached at the first tube inlet and second tube inlet. The fractionator can separate a heavy portion from the hydrocarbon fuel for subsequent direction to a partial oxidation zone in the first tube. A light portion can be separated from the hydrocarbon fuel for subsequent direction to a steam reforming zone in the second tube.

In another embodiment of the method for converting a hydrocarbon or alcohol fuel into hydrogen gas and carbon dioxide, a first mixture of first hydrocarbon or alcohol fuel and oxygen-containing gas is directed into a first tube. The hydrocarbon or alcohol fuel in the first mixture spontaneously partially oxidizes to form a first heated reformate stream that includes hydrogen gas and carbon monoxide. A second mixture of a second hydrocarbon or alcohol fuel and steam is directed into a second tube annularly disposed about the first tube. The second hydrocarbon or alcohol fuel of the second mixture partially steam reforms to form a second heated reformate stream that includes hydrogen gas and carbon monoxide. The first heated reformate stream and second heated reformate stream are directed through a catalyst reforming zone to further reform the reformate streams to hydrogen gas and carbon dioxide. In a preferred embodiment, the hydrocarbon fuel prior to direction into the first tube and the second tube is fractionated into heavy portion of the hydrocarbon fuel and a light portion of the hydrocarbon fuel. The heavy portion is subsequently directed to the partial oxidation zone. The light portion is directed to the steam reforming zone.

This invention has many advantages. The apparatus can use a variety of hydrocarbon fuels, such as gasoline, JP-8, methanol and ethanol. The partial oxidation reaction zone allows the fuel to partially burn while not forming soot and while providing heat to the steam reforming zone and the other portions of the reactor annularly disposed around the partial oxidation zone. Further, the apparatus is sufficiently compact for use in an automobile. In some embodiments, the apparatus includes a high temperature shift catalyst which allows the apparatus to be more compact and lighter in weight than if only a low temperature shift catalyst is used.

DETAILED DESCRIPTION OF THE INVENTION

The features and details of the method and apparatus of the invention will now be more particularly described with reference to the accompanying drawings and pointed out in the claims. The same numeral present in different figures represents the same item. It will be understood that the particular embodiments of the invention are shown by way of illustration and not as limitations of the invention. The principal features of this invention can be employed in various embodiments without departing from the scope of the invention. All percentages and parts are by weight unless otherwise indicated.

Figure 1:
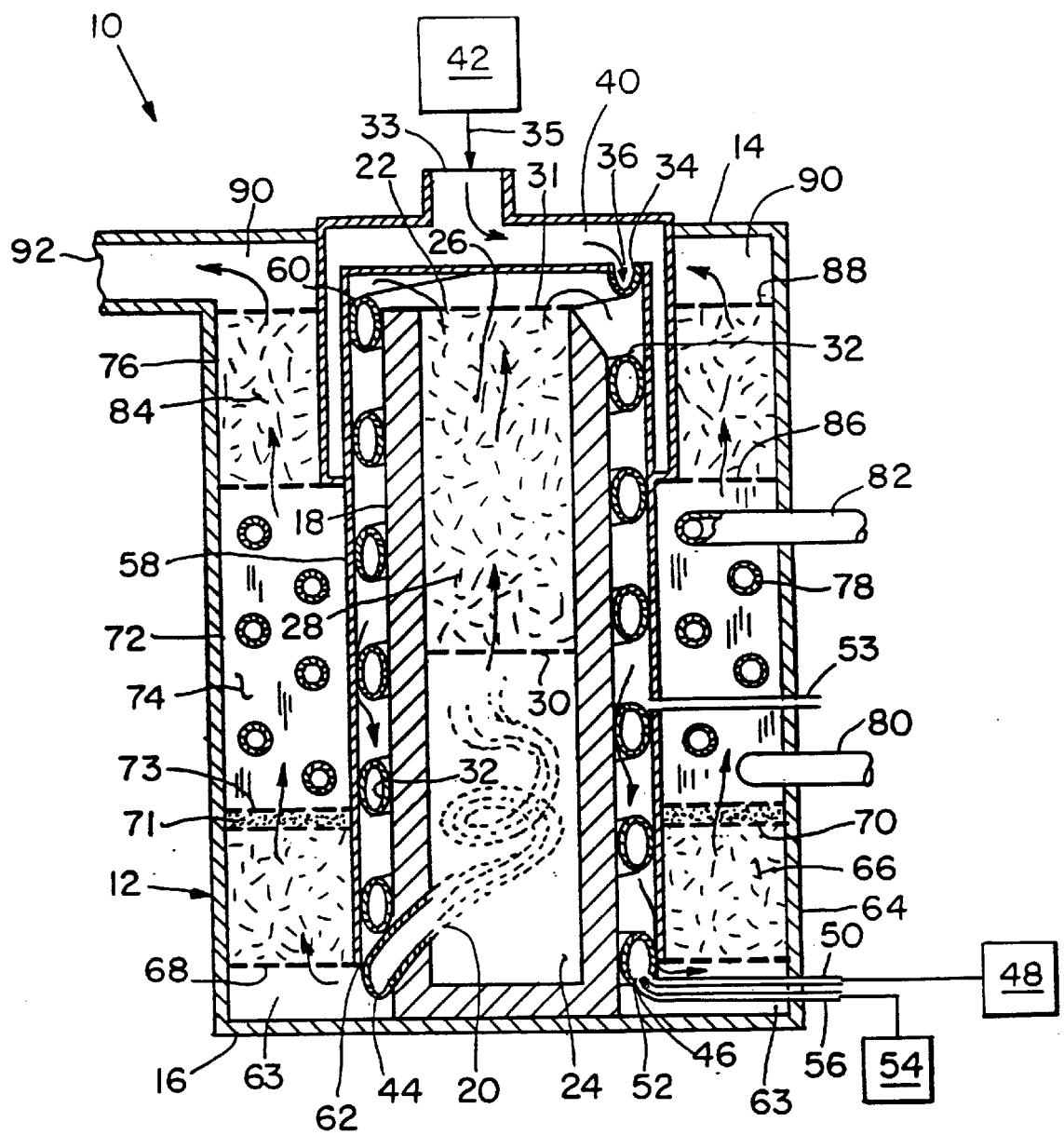
FIG. 1 is an orthogonal projection side view of one embodiment of the apparatus of the present invention.

One embodiment of the invention is shown in FIG. 1. A reformer 10 has a reformer vessel 12. The reformer vessel 12 can be cylindrical in shape. The reformer 10 has an upper portion 14 and a lower portion 16. Disposed in the center of the reformer vessel 12 is a first vessel 18 which extends substantially the height of the reformer vessel 12. The first vessel 18 has a first vessel inlet 20 for receiving gases into the first vessel 18 and can tangentially direct the gases through the first vessel 18. The first vessel 18 has a first vessel outlet 22 at the upper portion 14 of the reformer 10 for gases to exit the first vessel 18. A perforated plate 31 is located at the first vessel outlet 22 and covers the diameter of the first vessel 18. A partial oxidation reaction zone 24 is in the lower portion 16 of the first vessel 18.

The partial oxidation zone 24 is suitable for partial oxidation of a hydrocarbon or alcohol fuel with oxygen to form a mixture including carbon monoxide, steam and hydrogen gas. A steam reforming zone 26 is above the partial oxidation zone 24 and includes a steam reforming catalyst 28. Preferably, the steam reforming catalyst 28 includes nickel with amounts of a noble metal, such as cobalt, platinum, palladium, rhodium, ruthenium, iridium, and a support such as magnesia, magnesium aluminate, alumina, silica, zirconia, singly or in combination. Alternatively, the steam reforming catalyst 28 can be a single metal, such as nickel, supported on a refractory carrier like magnesia, magnesium aluminate, alumina, silica, or zirconia, singly or in combination, promoted by an alkali metal like potassium. The steam reforming zone 26 can auto thermally reform steam and methane generated in the partial oxidation zone 24 to hydrogen gas and carbon monoxide. The steam reforming catalyst 28, which can be granular, is supported within the partial oxidation zone 24 by a perforated plate 30 and a perforated plate 31.

A helical tube 32 extends about the length of the first vessel 18. A first end 34 of the helical tube 32 is located at an inlet housing 33. An oxygen source 42 is connected to the inlet housing 33 by a conduit 35 with a first end inlet 36 for receiving oxygen-containing gas from an oxygen gas zone 40. A second end 44 of the helical tube 32 is connected at the first vessel inlet 20. Examples of suitable oxygen-containing gas include oxygen ($O_2$), air, etc. A fuel inlet 46 is joined to the helical tube 32 proximate to the second end 44. A conduit 50 extends from a fuel source 48 to the fuel inlet 46. Examples of suitable fuels include hydrocarbons which encompass alcohols, also. Fuels include gasoline, kerosene, JP-8, methane, methanol and ethanol. A steam inlet 52 is proximate to the fuel inlet 46. Steam can be directed from a steam source 54 to a steam tube 56 through the first steam inlet 52 into the helical tube 32. In another embodiment, fuel and steam can be directed into the helical tube 32.

A second vessel 58 is annularly disposed about the first vessel 18. A second vessel inlet 60 receives gaseous products from the first vessel outlet 22. A second vessel outlet 62 at the lower portion 16 of the reformer 10 allows gas to exit the second vessel 58. The helical tube 32 is disposed between the first vessel 18 and the second vessel 58 and gases from the first vessel 18 can be directed through the second vessel 58 from the second vessel inlet 60 over and around the helical tube 32 to the second vessel outlet 62. A flow distribution region 63 conducts gas from the second vessel outlet 62 to a high temperature shift zone 64. Additional steam or water can be directed from a steam source into the second vessel 58 through a second steam inlet 53 to provide added steam to provide added cooling and further the reformation of the fuels.

A high temperature shift zone 64 is annularly located between the second vessel 58 and the reformer vessel 12 and includes a high temperature shift catalyst 66. An example of a suitable high temperature shift catalyst 66 are those that are operable at a temperature in the range of between about 300° C. and about 600° C. Preferably the high temperature shift catalyst 66 includes transition metal oxides, such as ferric oxide ($Fe_2O_3$) and chromic oxide ($Cr_2O_3$). Other types of high temperature shift catalysts include iron oxide and chromium oxide promoted with copper, iron silicide, supported platinum, supported palladium, and other supported platinum group metals, singly and in combination. The high temperature shift catalyst 66 is held in place by a perforated plate 68 and a perforated plate 70. Gas can pass through the high temperature shift zone 64 through the perforated plate 70 to a sulfur removal zone 71.

Above the high temperature shift zone 64 is the sulfur removal zone 71. The sulfur removal zone 71 includes a catalyst which can reduce the amount of hydrogen sulfide ($H_2S$), which is deleterious to a low temperature shift catalyst, in the gas stream to a concentration of about one part per million or less. An example of a suitable catalyst includes a zinc oxide. The sulfur removal zone 71 is sized depending on the type of fuel used. If a low sulfur fuel is used, a small sulfur removal zone is needed. If a high sulfur fuel is used, a larger sulfur removal zone is necessary. Gas can pass from the sulfur removal zone 71 through a perforated plate 73 to cooling zone 72.

The cooling zone 72 includes a plurality of vertical fins 74 which radiate from the second vessel 58 to the reformer vessel 12, and extends between high temperature shift zone 64 to low temperature shift zone 76.

A cooling tube 78 is helically disposed about the second vessel 58 and is attached to the vertical fins 74. The cooling tube 78 has a cooling tube inlet 80 for receiving a cooling medium, such as water, through the cooling tube 78 to a cooling tube outlet 82. In another embodiment, the cooling tube 78 is wound a second series of times around the second vessel 58. The gaseous products from the high temperature catalyst zone 64 can pass between the vertical fins 74 and pass over the cooling tube 78 allowing gaseous products to cool.

A low temperature shift zone 76 is annularly disposed above the cooling zone 78 and between the second vessel 58 and the reformer vessel 12 and includes a low temperature shift modifying catalyst 84 for reducing carbon monoxide to a level of less than about one percent, by volume, or below. An example of a suitable low temperature modifying catalyst 84 are those that are operable at a temperature in a range of between about 150° C. and about 300° C. Preferably, the low temperature modifying catalyst 84 includes cupric oxide (CuO) and zinc oxide (ZnO). Other types of low temperature shift catalysts include copper supported on other transition metal oxides like zirconia, zinc supported on transition metal oxides or refractory supports like silica or alumina, supported platinum, supported rhenium, supported palladium, supported rhodium and supported gold. The low temperature shift zone catalyst 84 is held in place by a lower perforated plate 86 and an upper perforated plate 88. Gaseous products from the cooling zone 72 can pass through the perforated plate 86, through the low temperature shift zone 76, and through the upper perforated plate 88. An exit zone 90 is above the low temperature shift zone 76 and has a reformer exit 92.

In the method for converting hydrocarbon fuel into hydrogen gas, an oxygen-containing gas, such as air, is directed from the oxygen source 42 through the conduit 35, to the inlet housing 33, to the oxygen gas zone 40, and into the first end inlet 36 of the helical tube 32. The reformer 10 can operate at a pressure in the range of between about 0 and 500 psig. The oxygen-containing gas, such as air, is preheated to a temperature of about 450° C. In a preferred embodiment, air has a velocity of greater than about 40 meters per second.

A suitable hydrocarbon or alcohol vapor is directed from the fuel source 48 through the fuel tube 50 to the fuel inlet 46. Examples of suitable hydrocarbon fuels include gasoline, JP-8, methanol, ethanol, kerosene and other suitable hydrocarbons typically used in reformers. Gaseous hydrocarbons, such as methane or propane, can also be used. Steam is directed from the steam source 54 through steam tube 56 to first steam inlet 52. The steam has a temperature in the range between about 100 and about 150° C. The air, steam and hydrocarbon fuel are fed at rates sufficient to mix within the helical tube 32 and spontaneously partially oxidize as the mixture enters the partial oxidation zone 24 through the first vessel inlet 20 to form a heated reformate stream that includes carbon monoxide and hydrogen gas. In a preferred embodiment, oxygen-containing gas is tangentially directed around the interior of the partial oxidation zone 24, which is an empty chamber. In the partial oxidation zone 24, the reformate products can include methane, hydrogen gas, water and carbon monoxide. The partial oxidation zone 24 has a preferred temperature in the range of between about 950° C. and about 1150° C. A heavier fuel is preferentially run at the higher end of the temperature range while a lighter fuel is run at a lower end of the temperature range.

From the partial oxidation zone 24, reformate products are directed through the perforated plate 30 to the steam reforming zone 26. In the steam reforming zone 26, the remaining hydrocarbon vapor in the heated reformate stream from the partial oxidation zone 24 is steam reformed in the presence of the steam reforming catalyst 28 into hydrogen gas and carbon monoxide. The steam reforming zone 26 typically has a temperature in the range of between about 700 and 900° C. The partial oxidation reaction provides sufficient heat to provide heat to the helical tube 32 to preheat the air and other contents of the helical tube 32 and also provide heat to the steam reforming step. The hydrocarbon fuel is burned partly in the partial oxidation zone 24 and the remainder of the fuel with the steam is mixed with the partial oxidation zone combustion products for steam reforming and hydrocarbon shifting to carbon monoxide and hydrogen gas in the presence of the steam reforming catalyst 28. The heated reformate stream exiting from the steam reforming zone 26 has a temperature of between about 700° C. and about 900° C. The heated reformate stream is directed between the first vessel 18 and the second vessel 58 and around the exterior of the helical tube 32, whereby the heated reformate stream is cooled by heating the contents of the helical tube 32 and also the first vessel 18 and the second vessel 56.

The heated reformate stream exits the second vessel outlet 62 to the flow distribution zone 63, where it has been cooled to a temperature of between about 300° C. and about 600° C. and is directed through the perforated plate 68 to the high temperature shift zone 64 where essentially all of the carbon monoxide is removed or reduced by contacting the heated reformate stream with the high temperature shift catalyst 66 at a temperature in the range of between about 300° C. and 600° C. The high temperature shift zone 64 operates adiabatically to reduce the carbon monoxide levels with modest temperature rise. In one embodiment, the heated reformate stream entering the high temperature shift zone 64 has about fourteen to seventeen percent carbon monoxide, by volume, and exits the high temperature shift zone 64 with about two to four percent carbon monoxide, by volume.

The high temperature shift zone-treated reformate stream is directed through the sulfur removal zone 71 where the hydrogen sulfide content of the stream is reduced to a concentration of less than about one part per million. From the sulfur removal zone 71, the reformate is directed to the cooling zone 72 where the stream contacts the vertical fins 74 and the cooling tubes 78 to lower the temperature of the stream to between about 150° C. and about 300° C. because the low temperature shift catalyst 84 is temperature sensitive and could possibly sinter at a temperature of above about 300° C. The cooling zone 72 cools the high temperature reformate gas for the low temperature shift zone 76. The cooling zone tubes 78 operate continuously flooded to allow accurate and maximum steam side heat transfer, to reduce fouling and corrosion to allow use of contaminated water, and to achieve a constant wall minimum temperature.

The reformate stream is directed through the perforated plate 86 to the low temperature shift reaction zone 76 where the reformate stream contacts the low temperature shift catalyst 84, converting at least a portion of the remaining carbon monoxide gas of the reformate stream to carbon dioxide by the low temperature shift reaction to form a product stream. The low temperature shift reaction zone 76 operates adiabatically to reduce the remainder of the carbon monoxide to trace levels with modest catalyst temperature rise. The resulting gas product stream exits the low temperature shift reaction zone 76 through the perforated plate 88, and to the exit gas zone 90 and reformer exit 92. The exiting product stream can have a composition of about 40% hydrogen gas and less than one percent carbon monoxide on a wet volume basis.

Figure 2:
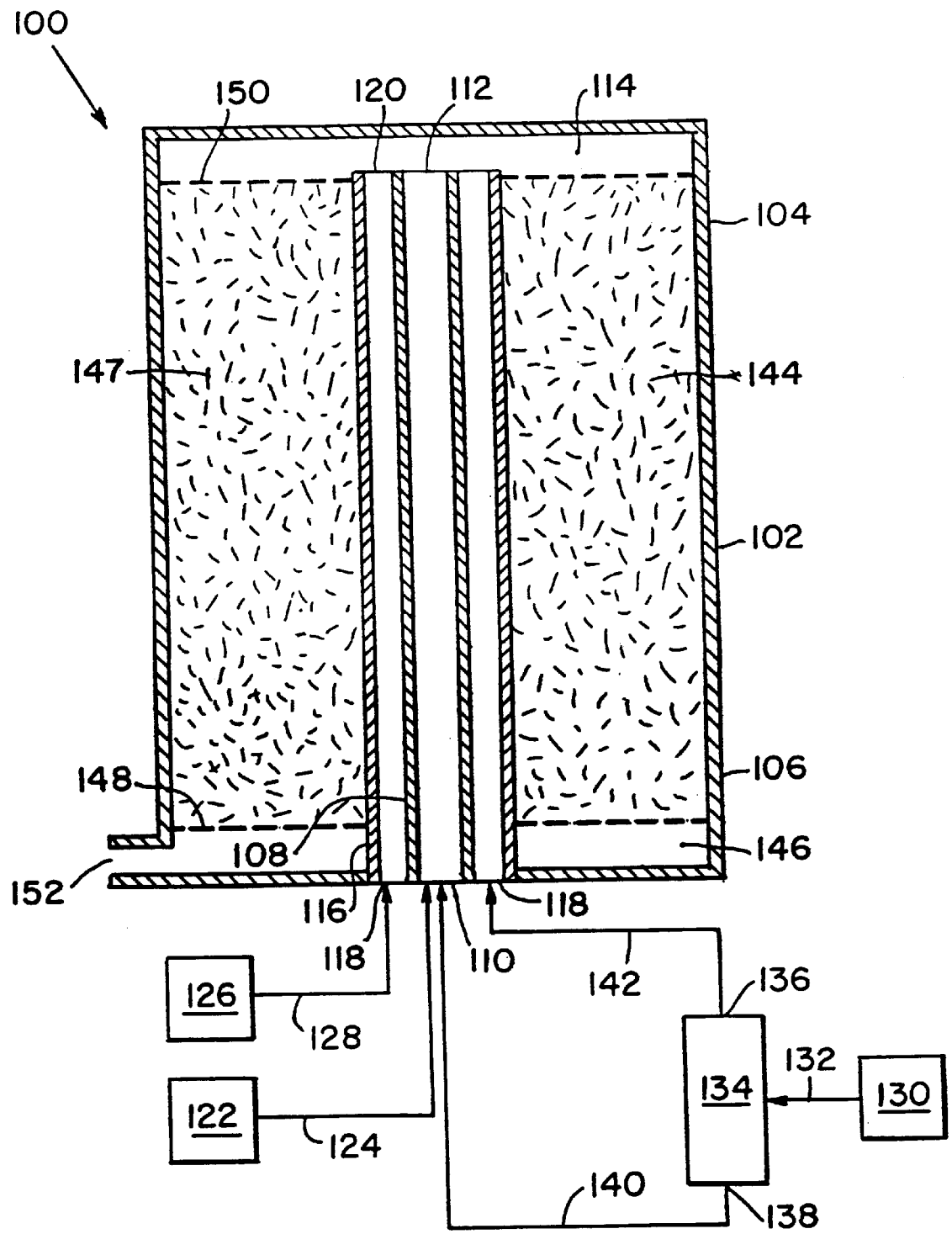
FIG. 2 is an orthogonal projection side view of a second embodiment of the apparatus of the present invention; and, FIG. 3 is an orthogonal projection side view of a third embodiment of the apparatus of the present invention.

A second embodiment of the invention is shown in FIG. 2. A second reformer 100 has a reformer shell 102. The reformer shell 102 has an upper portion 104 and a lower portion 106. Disposed in a center of the reformer shell 102 is a first tube 108 which extends substantially the height of the reformer shell 102. The first tube 108 has a first tube inlet 110 at the lower portion 106 for receiving gases into the first tube 108. The first tube 108 is configured for receiving a first mixture of oxygen and first hydrocarbon fuel. A first tube outlet 112 is configured for directing a first reaction reformate of the first mixture to a mixing zone 114.

A second tube 116 is annularly disposed about the first tube 108. The second tube 116 has a second tube inlet 118 for receiving second hydrocarbon fuel and steam. The second tube 116 also has a second tube outlet 120 for directing a second reaction reformate of a second mixture. The second tube 116 can include a steam reforming catalyst. An example of a suitable catalyst includes nickel with amounts of a noble metal such as cobalt, platinum, palladium, rhodium, ruthenium, iridium, and a support such as magnesia, magnesium aluminate, alumina, silica, zirconia, singly or in combination. Alternatively, the steam reforming catalyst can be a single metal, such as nickel, supported on a refractory carrier like magnesia, magnesium aluminate, alumina, silica, or zirconia, singly or in combination, promoted by an alkali metal like potassium. In another embodiment, the second tube 116 can be annularly disposed within the first tube 108, wherein steam and fuel can be directed into the center tube and fuel and oxygen can be directed into the tube annularly disposed around the center tube.

An oxygen source 122 is connected by an oxygen tube 124 to the first tube 108. An example of a suitable oxygen source 122 is oxygen gas or air. A steam source 126 is connected to the second tube 116 by a steam tube 128. In one embodiment, the steam source 126 can provide a source of steam at a temperature of about 150° C. and a pressure of about 60 psia.

A fuel source 130 is connected by a fuel tube 132 to a fractionator 134 The fuel source 130 includes a suitable fuel, such as a hydrocarbon, including gasoline, JP-8, kerosene, also alcohol including methanol and ethanol. The fractionator 134 has a light portion outlet 136 for directing a light portion from the fractionator 134, and a heavy portion outlet 138 for directing a heavy portion from the fractionator 134. The heavy portion can be directed from the heavy portion outlet 138 through a heavy portion tube 140 to the first tube inlet 110. The light portion can be directed from the light portion outlet 138 through a light portion tube 142 to the second tube inlet 118. In another embodiment, separate sources can be used for the heavy portion (first hydrocarbon fuel) and the light portion (second hydrocarbon fuel) without having a fractionator.

A catalyst reforming zone 144 is annularly disposed about the second tube 116. A first reaction reformate and second reaction reformate can be directed through the first tube outlet 112 and the second tube outlet 120, respectively, to the mixing zone 114 above the catalyst reforming zone 144.

The catalyst reforming zone 144 includes a catalyst 147 for further reforming of the mixtures to hydrogen gas. An example of a suitable catalyst 147 includes nickel with amounts of a noble metal such as cobalt, platinum, palladium, rhodium, ruthenium, iridium, and a support such as magnesia, magnesium aluminate, alumina, silica, zirconia, singly or in combination. Alternatively, the catalyst 147 can be a single metal, such as nickel, supported on a refractory carrier like magnesia, magnesium aluminate, alumina, silica, or zirconia, singly or in combination, promoted by an alkali metal, like potassium. The catalyst reforming zone 144 can have a height that is substantially the length of the first tube 108 and the second tube 116. The catalyst reforming zone 144 is sufficiently porous to allow passage of gas from an exit zone 146. The catalyst 147 in the catalyst reforming zone 144 is held in place by a lower perforated plate 148 and an upper perforated plate 150. Product gases of the catalyst reforming zone 144 can exit the second reformer 100 from the exit zone 146 through the reformer shell exit 152.

In the second embodiment of the invention for converting hydrocarbon fuel into hydrogen gas and carbon dioxide, a fuel is directed from fuel source 130 to the fractionator 134 through the fuel tube 132. The fuel is separated into a light portion and a heavy portion in the fractionator 134. The heavy portion is directed from the heavy portion outlet 138 through the heavy portion tube 140 to the first tube inlet 110. An oxygen-containing gas, such as air, is directed from the oxygen source 122 through the oxygen tube 124 to the first tube inlet 110. The oxygen-containing gas and the heavy portion of the hydrocarbon fuel form a mixture in the first tube 108, whereby the hydrocarbon fuel of the first mixture spontaneously partially oxidizes to form a first heated reformate stream that includes hydrogen gas and carbon monoxide. The first heated reformate stream can be heated to about 1,525° C. The ratio of fuel to oxygen is adjusted depending upon the type of fuel used. A heavier fuel can require a higher combustion temperature. The partial oxidation of the fuel results in the fuel mixture that includes carbon monoxide, water, hydrogen gas and methane. Excess heat from the partial oxidation reaction allows transfer of heat from the first tube 108 to the second tube 116. By burning the heavy portion at a temperature of above about 1,375° C. there is no significant formation of carbon soot or tar in the partial oxidation zone of, for example, the first tube 108. If necessary, ignition can be with a hot surface igniter or a spark plug.

The light portion of the fuel is directed from the light portion outlet 136 of the fractionator 134 through the light portion tube 142 to the second tube 116. Steam is directed from the steam source 126 through the steam tube 128 to the second tube inlet 118 into the second tube 116. Also, oxygen gas is directed from the oxygen source 122 through the oxygen tube 124 to the second tube inlet 118 into the second tube 116. In another embodiment, only steam is directed with a light portion of hydrocarbon fuel into second tube 116. A second mixture of oxygen-containing gas, a light portion of hydrocarbon fuel and steam is formed in the second tube 116 annularly disposed about the first tube 108. The hydrocarbon fuel of the second mixture partially reacts to form a second heated reformate stream that includes hydrogen gas and carbon monoxide. In the presence of steam, the second mixture partially steam reforms. The heat from the reaction in the first tube 108 provides energy to help cause the reaction to progress in the second tube 116.

The first heated reformate stream from the first tube 108 and the second heated reformate stream from the second tube 116 are directed through the first tube outlet 112 and the second tube outlet 120, respectively, into the mixing zone 114. The separate tubes 108,116 allow carbon reduced operation at high fuel to oxygen ratios of about four to one. It also allows using distillate fuels, such as gasoline, diesel fuel, jet fuel or kerosene, whereby heavy portion type fuels are preferentially directed to the first tube 108 for high-temperature combustion necessary to break heavy molecules while the light portion-type vapors are directed to the second tube 116 for partial steam reforming as a result of thermal contact with the combustion chamber. The first heated reformate stream and the second heated reformate stream mix within the mixing zone 114. The mixture is directed from the mixing zone 114 through the catalyst reforming zone 144 to the exit zone 146. In the catalyst reforming zone 144, the remainder of the carbon monoxide is reformed to carbon dioxide to form product stream. The product stream exits through the exit zone 146 and from the second reformer 100 through the reformer shell exit 152.

Figure 3:
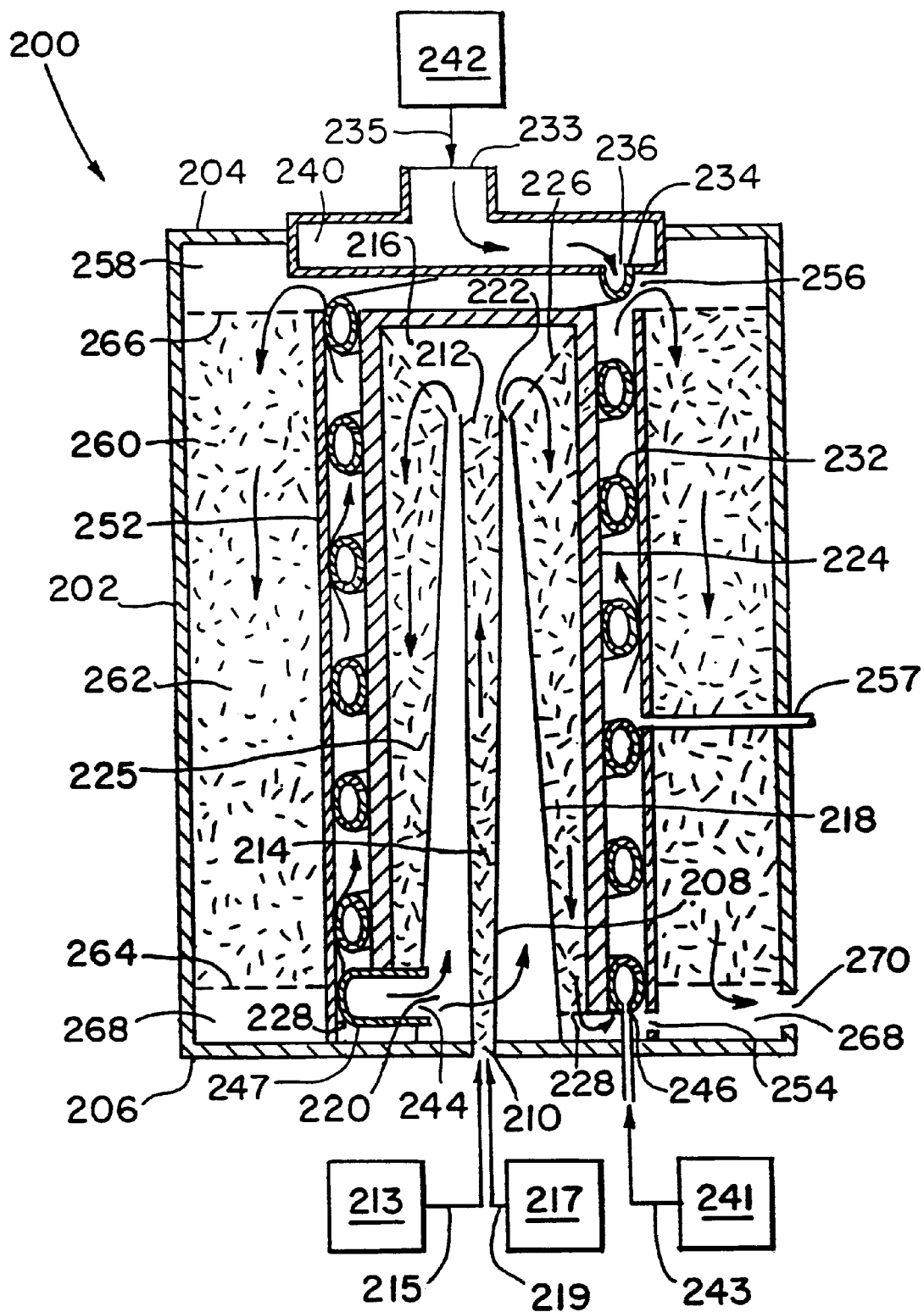

Another embodiment of the invention is shown in FIG. 3. A third reformer 200 has a reformer shell 202. The reformer shell 202 has an upper portion 204 and a lower portion 206. Disposed in a center of the reformer shell 202 is a first tube 208. The first tube 208 has a first tube inlet 210 at the lower portion 206 for receiving gases into the first tube 208. The first tube 208 has a first tube outlet 212 at the upper portion 204 for gases to exit the first tube 208. The first tube 208 includes a steam reforming catalyst 214 for reforming a hydrocarbon in the presence of steam. An example of a suitable steam reforming catalyst 214 is nickel with amounts of a noble metal such as cobalt, platinum, palladium, rhodium, ruthenium, iridium, and a support such as magnesia, magnesium aluminate, alumina, silica, zirconia, singly or in combination. Alternatively, the steam reforming catalyst 214 can be a single metal, such as nickel, supported on a refractory carrier like magnesia, magnesium aluminate, alumina, silica, or zirconia, singly or in combination, promoted by an alkali metal like potassium. The first tube 208 is configured for receiving a mixture of steam and a first hydrocarbon or alcohol fuel. The first tube outlet 212 is configured for directing a first reaction reformate of the first mixture to a mixing zone 216. The first tube 208 can be uniform in diameter, or alternatively, can be tapered such as by having a smaller diameter at the first tube inlet 210 than the diameter at the first tube outlet 212.

A steam source 213 is connected to the first tube 208 by a steam tube 215. The steam source 213 can provide a source of steam at a temperature of about 150° C. and a pressure of about 60 psia. A light fuel source 217 is connected by a light fuel tube 219 to the first tube 208 for directing light fuel into the first tube 208. The light fuel includes a suitable fuel such as a hydrocarbon, including gasoline, JP-8, kerosene, also alcohol including methanol and ethanol.

A second tube 218 is annularly disposed about the first tube 208. The second tube 218 has a second tube inlet 220 for receiving a mixture of oxygen and heavy hydrocarbon fuel. The second tube 218 also has a second tube outlet 222 for directing a second reaction reformate of a second mixture. The second tube 218 can have a uniform diameter along its length, or alternatively, a wider diameter at the lower portion 206 and narrower diameter at the upper portion 204. The second tube outlet 222 is configured for directing a second reaction reformate of the second mixture to the mixing zone 216.

Annularly disposed about the second tube 218 is a third tube 224. The third tube 224 has a third tube inlet 226 proximate to the mixing zone 216 for receiving a mixture of the first reaction reformate of the first mixture and the second reaction reformate of the second mixture. The third tube 224 has a third tube outlet 228 for directing mixture of the first reaction reformate and second reaction reformate from the third tube 224. The third tube 224 can include a steam reforming catalyst 225 for further reforming the hydrocarbon present in the mixture. An example of a suitable steam reforming catalyst 225 includes the same catalyst described for the steam reforming catalyst 214.

A helical tube 232 extends about the length of the third tube 224. A first end 234 of the helical tube 232 is located at an inlet housing 233. An oxygen source 242 is connected to the inlet housing 233 by a conduit 235 with a first end inlet 236 for receiving an oxygen-containing gas from an oxygen gas zone 240. A second end 247 of the helical tube 232 has a helical tube outlet 244 for directing oxygen containing gas into the second tube 218. Examples of a suitable oxygen-containing gas include oxygen ($O_2$), air, etc.

A heavy fuel source 241 is connected by a heavy fuel tube 243 to a heavy fuel inlet 246. The heavy fuel inlet 246 is joined to the helical tube 232 proximate to the second end 247. Examples of suitable heavy fuels include gasoline, kerosene, JP-8, methanol and ethanol. In another embodiment, the same sources of fuel can be used for the heavy fuel (first hydrocarbon fuel) and the light fuel (second hydrocarbon fuel). Alternatively, a fractionator, as described in FIG. 2, can be used to supply a heavy fuel and a light fuel. In another embodiment, the light fuel and heavy fuel can be the same and can come from the same source.

A vessel 252 is annularly disposed about the third tube 224. The vessel inlet 254 can direct reformate products from the third tube outlet 228 into the vessel 252. The helical tube 232 is disposed between the vessel 252 and the third tube 224, and gases from the third tube 224 can be directed through the vessel 252 from the vessel inlet 254 over and around the helical tube 232 to a vessel outlet 256. A flow distribution region 258 conducts gas from the vessel outlet 256 to a catalyst reforming zone 260. Additional steam can be added through a second steam inlet 257 to provide added cooling and water for reforming.

The catalyst reforming zone 260 is annularly disposed about the vessel 252. The catalyst reforming zone 260 includes a catalyst 262 for further shifting the reformate to hydrogen gas. An example of a suitable catalyst 262 includes ferric oxide ($Fe_2O_3$) and chromic oxide ($Cr_2O_3$). Other types of high temperature shift catalysts include iron oxide and chromium oxide promoted with copper, iron silicide, supported platinum, supported palladium, and other supported platinum group metals, singly and in combination. The catalyst 262 can be in powdered form and have a height substantially the height of the vessel 252. The catalyst reforming zone 260 is sufficiently porous to allow passage of gas from the flow distribution region 258 to an exit zone 268. The catalyst 262 in the catalyst reforming zone 260 is held in place by a lower perforated plate 264 and an upper perforated plate 266. Product gases of the catalyst reforming zone 260 can exit the third reformer 200 from an exit zone 268 through a reformer shell exit 270.

In a third embodiment of the invention for converting hydrocarbon or alcohol fuel into hydrogen gas and carbon dioxide, a fuel is directed from the light fuel source 217 through the light fuel tube 219 to first tube inlet 210. The steam is directed from the steam source 213 through the steam tube 215 to the tube inlet 210 into the tube 208. The light fuel partially reacts with the steam to form a first heated reformate stream that includes hydrogen gas and carbon monoxide. The first heated reformate stream is directed from the first tube 208 through the first tube outlet 212 to the mixing zone 216.

An oxygen containing gas, such as air, is directed from the oxygen source 242 through the conduit 235 to the inlet housing 233 to the oxygen gas zone 240 into the first end inlet 236 of the helical tube 232. The oxygen containing gas, such as air, is preheated to a temperature of about 450° C. In a preferred embodiment, the air has a velocity of greater than about 40 meters per second. As oxygen containing gas is directed through the helical tube 232, a suitable heavy fuel vapor is directed from the heavy fuel source 241 through the heavy fuel tube 243. Examples of suitable heavy fuels include JP-8, kerosene and other hydrocarbon fuels typically used in reformers. Gaseous hydrocarbons, such as methane and propane, can also be used. The oxygen-containing gas and heavy fuel are fed at rates sufficient to mix within the helical tube 232 and spontaneously partially oxidize as the mixture enters the second tube 218 through the second tube inlet 220 to form a heated second reformate stream that includes steam, carbon monoxide and oxygen gas. In a preferred embodiment, oxygen-containing gas is tangentially directed around the interior of the second tube 218. A hydrocarbon fuel of second mixture partially reacts to form a second heated reformate stream that includes hydrogen gas and carbon monoxide. The heat in the second tube 218 provides energy to cause the reaction to progress in the first tube 208.

The fuel that is fed into the first tube 208 and the second tube 218 may or may not be about equal in amount. A second tube 218, the partial oxidation chamber, is operated at a ratio of about two to one, fuel to oxygen gas, for example, with a temperature of about 1375° C. Heat transfer from the second tube 218 to the first tube 208 can cause partial steam reforming in the first tube 208 while the temperature is maintained at about 925° C. For liquid fuels, such as gasoline and light kerosene, the lighter fuel ends are pre-vaporized for delivery to the first tube 208. Heavy fuels are burned in the partial oxidation zone where high temperature (about 1375° C.) can break down fuel with minimal carbonization.

The first heated reformate stream from the first tube 208 and the second heated reformate stream from the second tube 218 are directed to a first tube outlet 212 and a second tube outlet 222, respectively, into a mixing zone 216. The separate tubes 208,218 allow carbon reduced operation at high fuel to oxygen ratios of about four- or five-to-one, thereby reducing soot formation. It allows using distillate fuels, such as gasoline or kerosene, whereby heavy portion type fuels are preferentially directed to a second tube 218 for high temperature combustion necessary to break heavy molecules while light portion-type vapors are directed to a first tube 208 for partial steam reforming as a result of thermal contact with the heated combustion from the second tube 218. The first heated reformate stream and the second heated reformate stream mix within the mixing zone 216. The mixture is directed from the mixing zone 216 through the third tube inlet 226 into the third tube 224.

In a third tube 224, a further portion of the fuel is reformed to hydrogen and carbon monoxide to form a third tube reformate stream. The third tube reformate stream exits through a third tube outlet 228. The third tube reformate products are directed through the vessel inlet 254 into the vessel 252 where the reformate stream passes over and around the helical tube 232 to the vessel outlet 256. Additional steam can be added to the vessel 252 through the steam inlet 253 to provide additional cooling and further reform the hydrocarbon and carbon monoxide present in the reformate stream. The reformate stream is directed from the flow distribution region 258 through the catalyst reforming zone 260 where the reformate stream is directed through the catalyst reforming zone for further reforming the carbon monoxide into hydrogen gas and carbon dioxide to form product stream having a concentration of about 0.5 percent, by volume, carbon monoxide. The product stream exits through the exit zone 268 through the shell exit 270.

Equivalents

Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A reformer for converting a hydrocarbon fuel into hydrogen gas and carbon dioxide comprising:
   a first tube including a first catalyst;
   a second tube annularly disposed about the first tube;
   a fuel fractionator configured to convert a quantity of hydrocarbon feedstock into a first fuel and a second fuel, wherein the second fuel is heavier in average molecular weight than the first fuel;
   a first fuel line interconnecting the fuel fractionator and the first tube;
   a steam supply line communicating with the first tube;
   a second fuel line interconnecting the fuel fractionator and the second tube; and,
   an oxygen-containing gas supply line communicating with the second tube.

2. The reformer of claim 1 further comprising a third tube annularly disposed about the second tube and adapted for receiving a first reaction reformate from the first tube and a second reaction reformate from the second tube, and for producing a third reaction reformate.

3. The reformer of claim 1 wherein the first tube has a tapered diameter.

4. The reformer of claim 1 wherein the second tube has a tapered diameter.

5. The reformer of claim 4 wherein the first tube has a first tube inlet and a first tube outlet and the second tube has a second tube inlet and a second tube outlet, the first tube inlet having a diameter less than the first tube outlet and the second tube outlet having a diameter less than the second tube inlet.

6. The reformer of claim 2 wherein the third tube has a second catalyst.

7. The reformer of claim 2 further comprising a mixing zone adapted for receiving the first reaction reformate from the first tube and the second reaction reformate from the second tube and directing the first and second reaction reformates into the third tube.

8. The reformer of claim 2 further comprising:
   a helical tube disposed about the third tube and having a first end communicating with an oxygen source and a second end communicating with the second tube, the helical tube adapted for receiving the second fuel at a point proximate to the second end and directing the second mixture into the second tube; and,
   a first vessel disposed about the third tube and the helical tube and adapted for directing the third reaction reformate from the third tube through the first vessel and around the helical tube.

9. The reformer of claim 8 wherein the first vessel further includes a water inlet.

10. The reformer of claim 8 further comprising a second vessel disposed about the first vessel and defining a shift reaction zone between the first and second vessels, the shift reaction zone including a third catalyst.

11. The reformer of claim 10 further comprising a flow distribution region adapted for receiving the third reaction reformate from the first vessel and directing the third reaction reformate into the second vessel.

* * * * *